(12) United States Patent
Sattler et al.

(10) Patent No.: US 7,680,695 B2
(45) Date of Patent: Mar. 16, 2010

(54) METHOD AND SYSTEM FOR ROLE-BASED AUTHORIZATION IN WEB SHOPPING

(75) Inventors: Wolfgang Sattler, Kirkel (DE); Sumit Sharma, Wiesloch (DE); Winfried Gerg, Rott (DE)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 11/125,130

(22) Filed: May 10, 2005

(65) Prior Publication Data

US 2006/0259367 A1 Nov. 16, 2006

(51) Int. Cl.
*G06Q 30/00* (2006.01)
(52) U.S. Cl. ......................................................... 705/26
(58) Field of Classification Search .................. 705/26, 705/27
See application file for complete search history.

(56) References Cited

U.S. PATENT DOCUMENTS

| 6,266,651 | B1* | 7/2001 | Woolston .................... 705/27 |
| 2002/0111892 | A1* | 8/2002 | Sharp et al. .................... 705/37 |
| 2004/0260622 | A1* | 12/2004 | Chan et al. .................... 705/26 |
| 2005/0201392 | A1* | 9/2005 | Tam et al. .................... 370/401 |
| 2005/0268042 | A1* | 12/2005 | Wall et al. .................... 711/130 |
| 2006/0026682 | A1* | 2/2006 | Zakas .......................... 726/22 |
| 2006/0195725 | A1* | 8/2006 | Shah et al. .................... 714/38 |

\* cited by examiner

*Primary Examiner*—Mila Airapetian
(74) *Attorney, Agent, or Firm*—Kenyon & Kenyon LLP

(57) ABSTRACT

Embodiments of the present invention relate to a method and system for role-based authorization in web shopping. According to the embodiments, operations available to a user of a web shop may be filtered based on the user's role, and correspond authorization level, within an organization.

14 Claims, 8 Drawing Sheets

100

120.4.2

| Transactions | Activities | B2B Full Authorizations | B2B Order Authorizations | B2B View Authorizations | BOB Full Authorizations | HOM Full Authorizations | HOM View Authorizations |
|---|---|---|---|---|---|---|---|
| Sales Order (Collective Order) | Display | x | x |  | x | x | x |
|  | Change | x | x |  | x | x |  |
|  | Create | x | x |  | x | x |  |
| Order Template | Display | x | x | x | x |  |  |
|  | Change | x | x | x | x |  |  |
|  | Delete | x | x | x | x |  |  |
|  | Create | x | x | x | x |  |  |
| Quotation | Display | x | x |  |  |  |  |
|  | Change | x |  |  |  |  |  |
|  | Create | x |  |  |  |  |  |
| Contract | Display | x | x |  |  |  |  |
|  | Change | x |  |  |  |  |  |
|  | Create | x |  |  |  |  |  |
| Invoice | Display | x |  |  |  |  |  |
| Credit Memos | Display | x |  |  |  |  |  |
| Debt Memos | Display |  |  |  |  |  |  |
| Product Catalog | Display Prices |  | x | x | x |  |  |
|  | Display Attachments | x | x | x | x |  |  |
| Hosted Order | Display |  |  |  |  | x | x |
|  | Change |  |  |  |  | x |  |
| Customer | Change (existing) |  |  |  | x |  |  |
|  | Create (new) |  |  |  | x |  |  |

FIG. 2

METHOD AND SYSTEM FOR ROLE-BASED AUTHORIZATION IN WEB SHOPPING

BACKGROUND OF THE INVENTION

Internet "web shop" applications are known. A web shop is an Internet site that permits a user to do such things as browse a catalog of products, select products and features to buy, and provide shipping instructions and payment to a vendor, from an online connection.

Accordingly, it is not surprising that business organizations may seek to benefit from the convenience provided by the web shop model. That is, most business organizations need to purchase products in the course of business, and to perform the corresponding accounting procedures. Usually, persons within a business organization have defined roles with varying scopes of authority. A person's role within an organization might, in particular, affect what actions he or she should or should not be authorized to take pursuant to web-based commerce.

Typically, using a web shop involves navigating through a series of screen displays generated by a network server computer and sent to a remote client terminal. A user is usually required to make a set of selections from menus, drop-down lists and the like to complete a purchase. To simplify and reduce errors in web shopping for a business organization, it would be advantageous to filter what is presented to a user in a screen display of a web shop application based on the user's authorization level.

BRIEF DESCRIPTION OF THE DRAWINGS

FIG. 2 shows a role-to-rights mapping according to embodiments of the present invention;

DETAILED DESCRIPTION

Embodiments of the present invention relate to a method and system for role-based authorization in web shopping. According to the embodiments, operations available to a user of a web shop may be filtered based on the user's role, and corresponding authorization level, within an organization.

Figure 1:
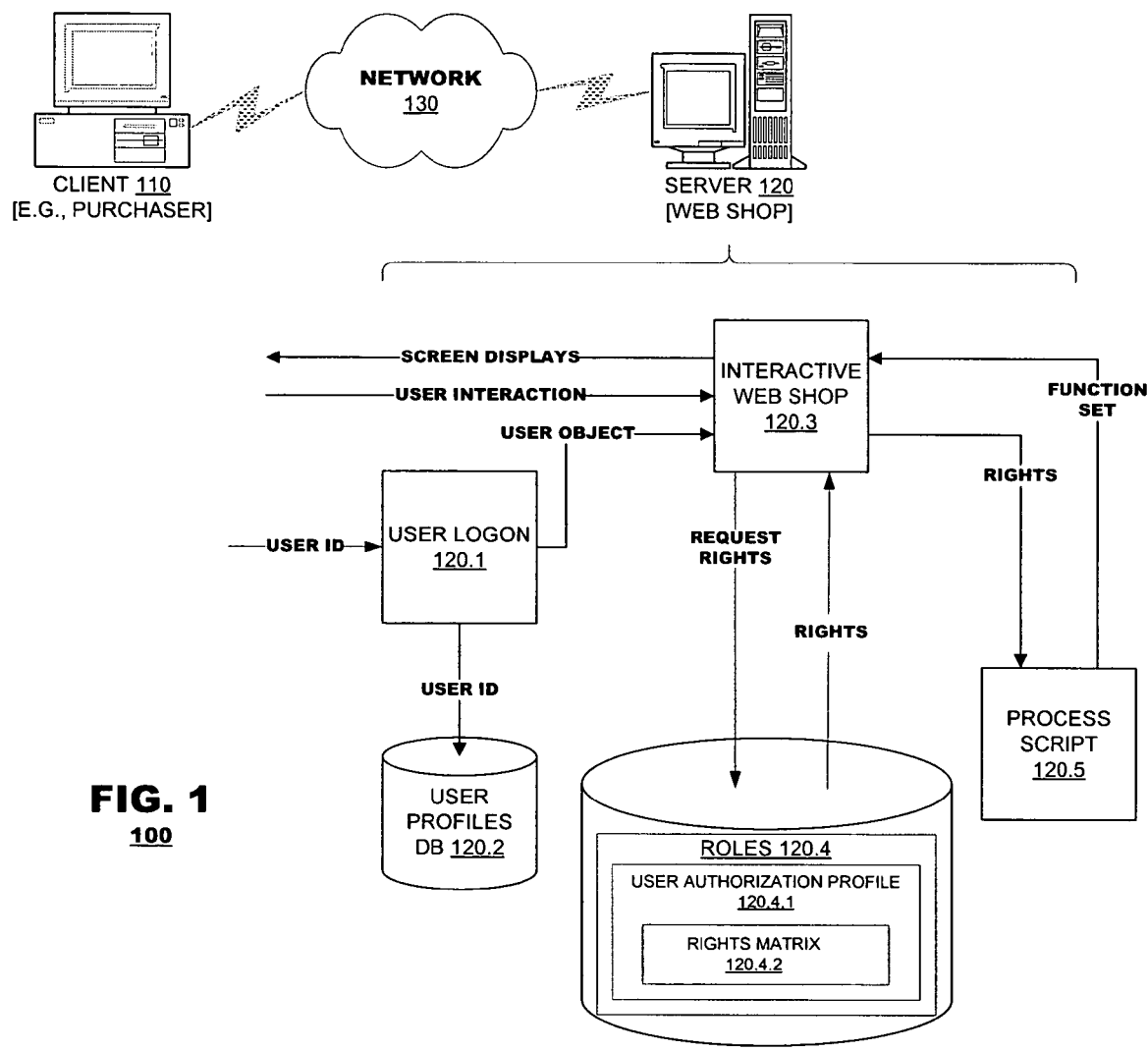
FIG. 1 shows a system according to embodiments of the present invention.

FIG. 1 shows a system according to embodiments of the present invention. The system may comprise a client terminal 110, which may be coupled via a network 130 to a web shop server 120. The network 130 may be the Internet, for example.

The web shop server 120 may comprise computer-executable instructions and data represented by function blocks 120.1-120.5. The instructions and data may be electronically stored on a machine-readable medium such as disk or processor memory. User logon functionality 120.1 may authenticate a user logging on to a web shop, i.e., a user newly establishing a web shopping session with interactive web shop functionality 120.3 The interactive web shop functionality 120.3 may receive user inputs from an authenticated user and generate screen displays in response. The screen displays may be sent via the network 130 back to the client terminal 110 to enable the user to navigate through a session, for example a session to order a product or products.

To authenticate a user logging on, the user logon functionality 120.1 may request and receive a user identifier and password. The user logon functionality 120.1 may compare the user identifier and password information with user profile information in a user profiles database 120.2 to determine whether a user is authentic and therefore entitled to perform at least some activity in the web shop. The user profiles database 120.2 may further contain information assigning a role within an organization, and a corresponding authorization level, to the user.

If the user logon functionality determines that a user is authentic, it may assign a user object to the user, and pass the user object to the interactive web shop functionality 120.3. The interactive web shop functionality 120.3 uses information associated with the user (which represents the user role) to determine the user's rights within the web shop. More specifically, a rights matrix 120.4.2 to determine the user's rights within the web shop, based on the user's role, may be consulted by the interactive web shop 120.3. The rights matrix 120.4.2 may reside in a user authorization profile 120.4.1 in a roles database 120.4. The user's rights determine the scope of the user's access to various functions and capabilities of the interactive web shop functionality 120.3. The scope of the user's access may relate to the user's role within the organization.

The rights matrix 120.4.2 may contain a role-to-rights mapping. FIG. 2 shows an example of a rights matrix 120.4.2. The matrix correlates organizational roles with transactions that can be performed within the web shop. For example, a web shop may provide transactions "Sales Order," "Order Template," "Quotation" and so on as shown in column 2.1. Each transaction may further comprise one or more possible activities (col. 2.2), such as "Display," "Change," "Create" or "Delete."

Columns 2.3-2.8 show a plurality of possible roles that could be assigned a user. An "x" in any one of columns 2.3-2.8 indicates a "right," i.e. an authorized activity for the corresponding role. For example, a "B2B Full Authorizations" role (col. 2.3) is permitted to perform any of the activities available within any of the transactions in column 2.1 except for "Hosted Order" and "Customer." By contrast, a "B2B View Authorizations" role (col. 2.5) is only permitted to perform the "Order Template" and "Product Catalog" transactions. A "B2B Order Authorizations" role (col. 2.4) can perform the "Display" activity of a "Quotation" transaction, but not the "Change" or "Create" activities.

An interactive session with the interactive web shop functionality 120.3 may comprise progressing through a plurality of stages, where one or more activities is performed at each stage. For example, an initial stage might include the presentation of a "Welcome" screen, where an authenticated user is asked to select from a number of options, such as "Create a new order", "Get new quotation" or the like. Later stages might present other options conditioned on earlier selections. A sequence of stages may be controlled by a process script 120.5. Based at least in part on a user's rights as determined by the interactive web shop functionality 120.3, a process script 120.5 may provide a filtered function set as the set of functions available to the user during a web shopping session.

Figure 3A:
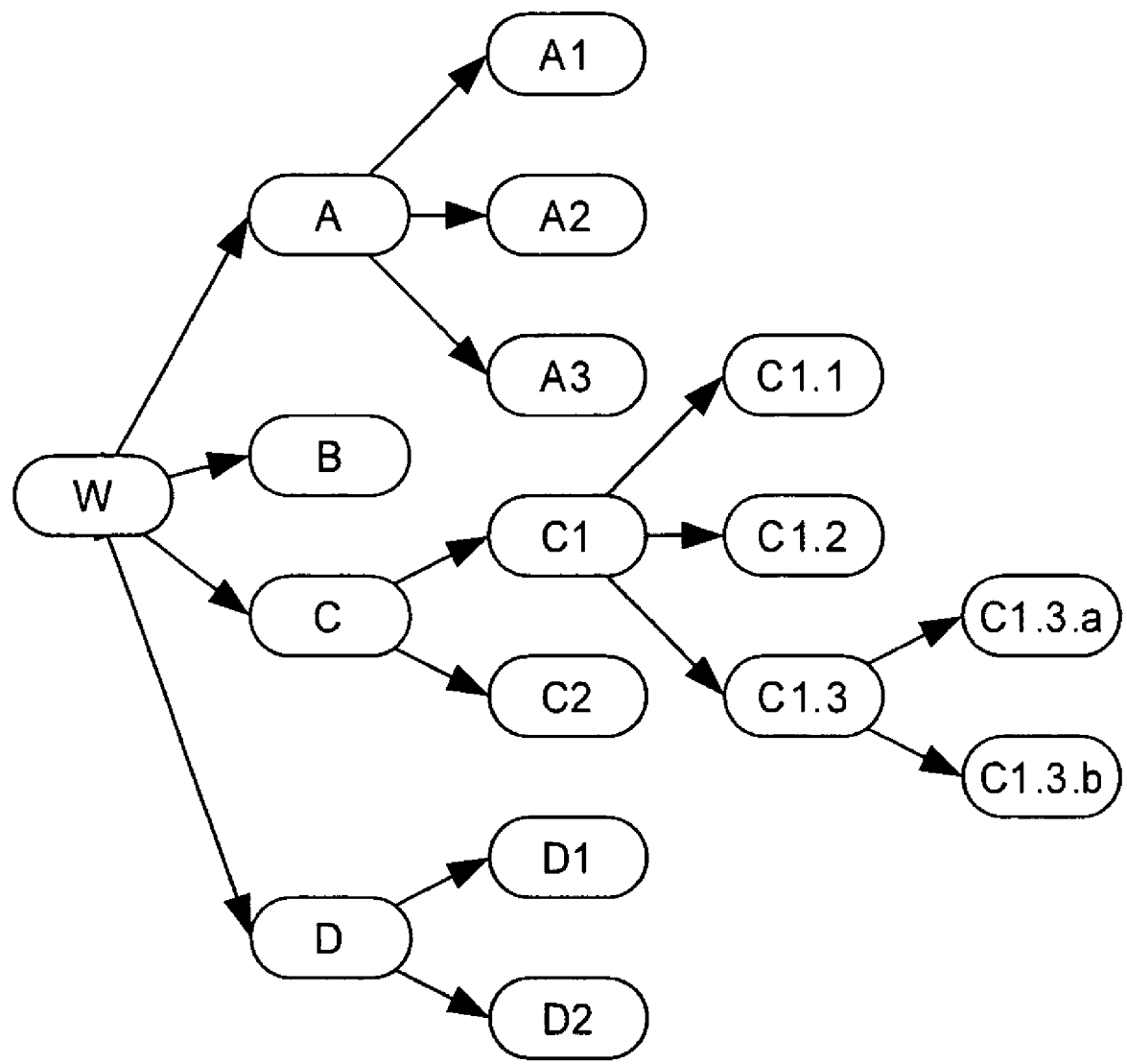
FIGS. 3A-3C show examples of process scripts according to embodiments of the present invention.
Figure 3B:
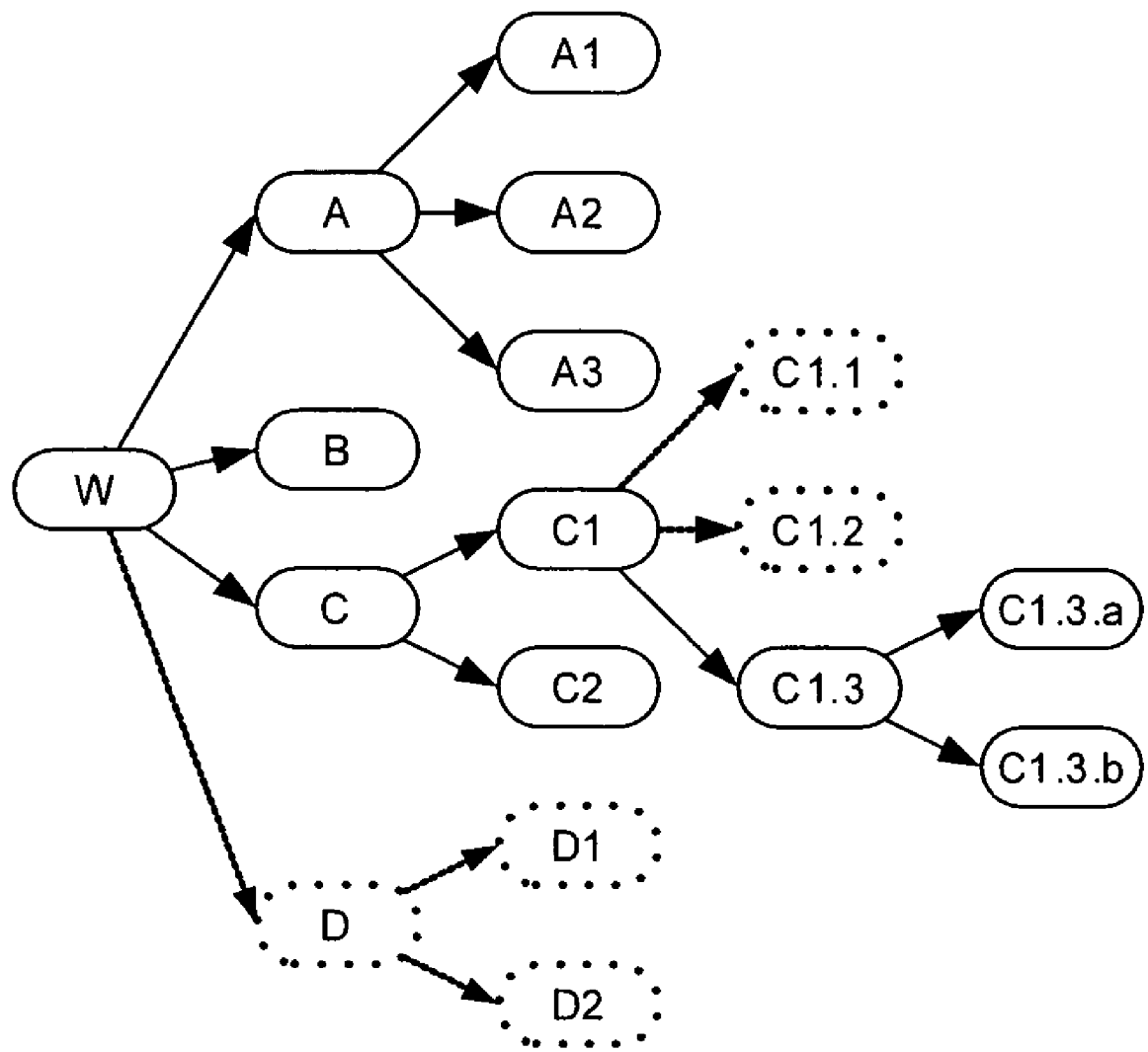

FIGS. 3A-3B illustrate process scripts. Referring to FIG. 3A, a process script may be viewed as comprising a base or root stage with a corresponding function set, from which one or more further stages, each with respective function sets, may ensue. The function sets correspond to "activities" as discussed in connection with FIG. 2, but are not limited to the examples shown in FIG. 2. For example, a root stage W may correspond to a "Welcome" screen display transmitted by the interactive web shop 120.3 to a client terminal 110. The "Welcome" display may present the user with one or more options, each corresponding to a transaction as described above with reference to FIG. 2. The options may be limited according to a given user's rights.

The example of FIG. 3A represents a process script for a user with full rights. Thus, root stage W presents a user with all of the available options for the following stage, that is, function set {A, B, C, D}. Each of options A, C and D, in turn, presents the user with a full function set {A1, A2, A3}, {C1, C2} and {D1, D2} in the next stage. Similarly, option C1 presents the user with a full function set {C1.1, C1.2, C1.3} in the penultimate stage. Finally, option C1.3 presents the user with a full function set {C1.3.a, C1.3.b} in the last stage.

By way of contrast, FIG. 3B represents the same process script as in FIG. 3A, but where the user's available function set is limited by the role and corresponding rights assigned to the user. Specifically, the role is different from the role of the user in FIG. 3A, and the rights assigned to the role are less than full rights. In FIG. 3B, a function set that is filtered out or disabled due to the user's role is illustrated by a broken or dotted outline. Thus, in FIG. 3B, option D is not available the user, and consequently, neither are options D1 and D2. Similarly, options C1.1 and C1.2 are disabled for the user.

Figure 3C:
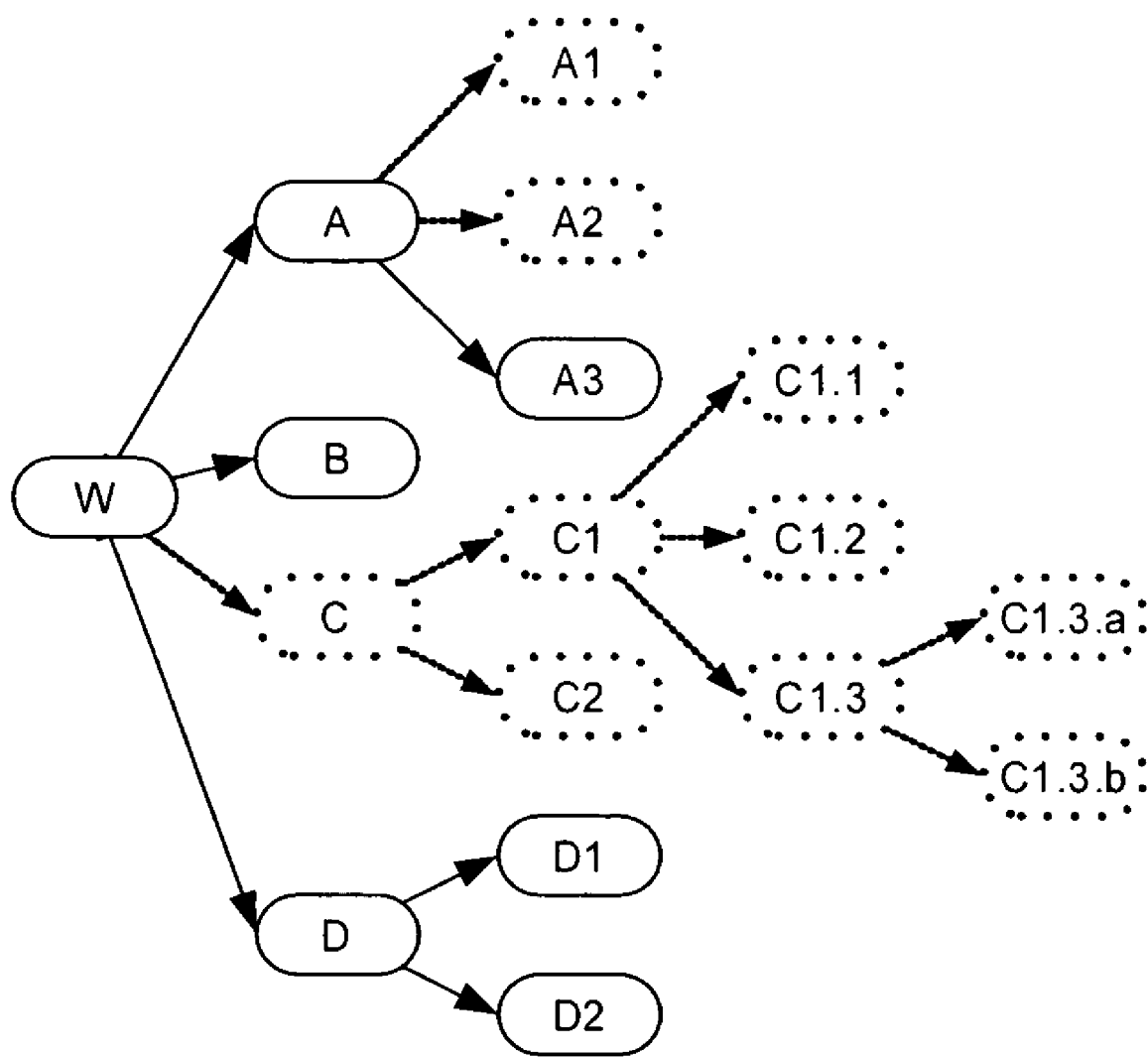

FIG. 3C illustrates the process script where a user's options are even further limited by his/her role compared to the process scripts of FIGS. 3A and 3B. In FIG. 3C, options C, C1, C2, C1.1, C1.2, C1.3, C1.3.a and C1.3.b are all disabled for the user.

In an actual screen display of a process script, filtering of function sets based on user rights may be manifested by only displaying to the user those navigation keys corresponding to a permitted function set. More specifically, a method according to embodiments of the present invention may comprise, in an interactive web shopping session, comparing a user profile against a rights matrix defining user roles and permissions therefor. A process script defining operational stages for the web shopping session and succession therebetween may be retrieved. The method may further include, at each operational stage, identifying with reference to the permissions associated with the user's role which successive operational stages are available to the user, and displaying to the user only those navigation keys that are associated with the permitted successive operational stages.

A process script may be static for a given organization, and need not be generated dynamically during runtime. That is, a process script may include the complete set of functions which can be performed within the organization, and this same script may be adapted for use by persons of various authorization levels using the filtering described above.

Figure 4A:
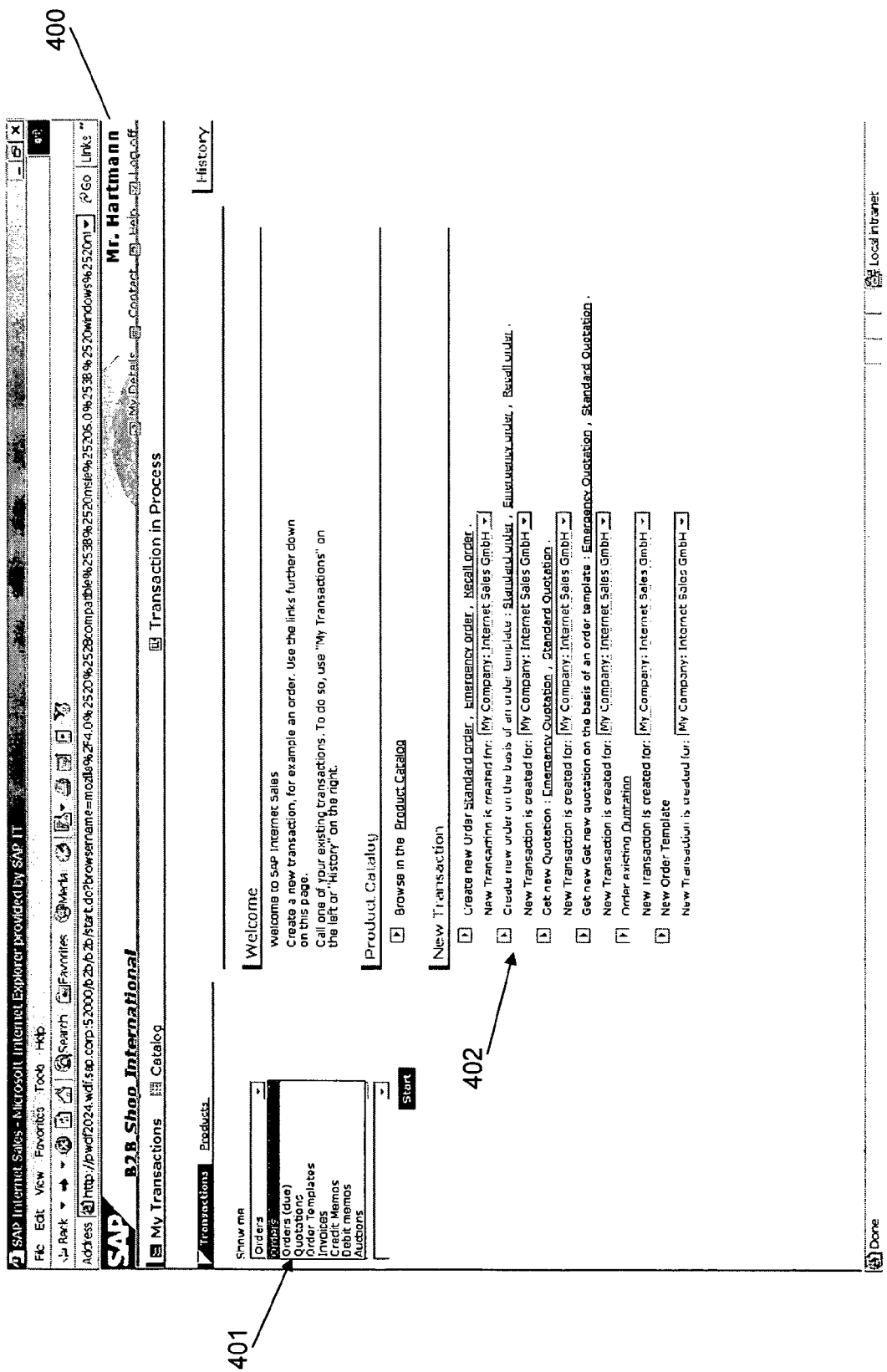
FIGS. 4A and 4B show a non-filtered and a filtered screen display, respectively, based on user authorization level, according to embodiments of the present invention.
Figure 4B:
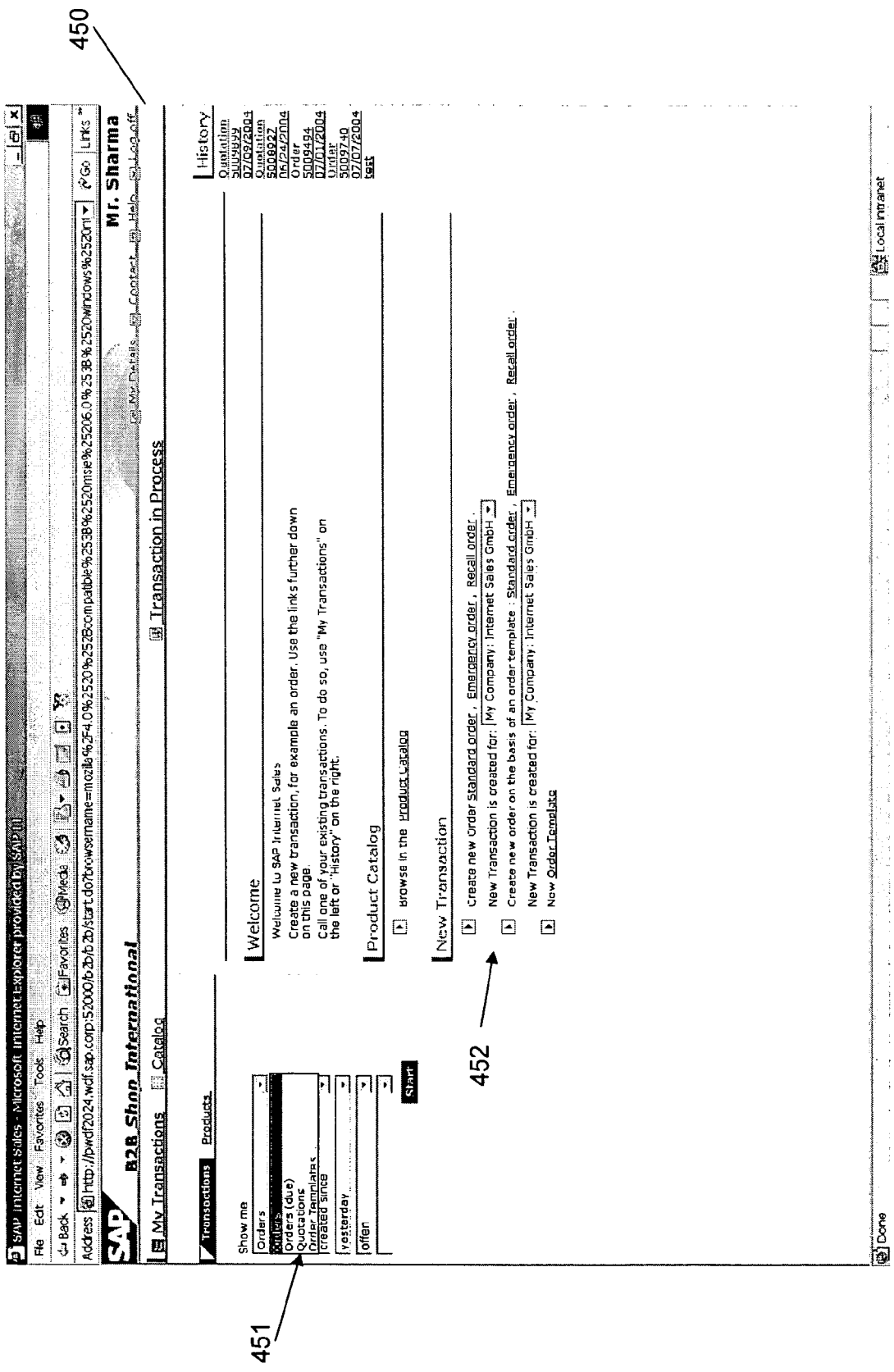

As noted above, in an actual screen display of a process script, filtering of function sets based on user rights may be manifested by non-display of an input field for a disabled function. An example is shown in FIGS. 4A and 4B. FIG. 4A shows a first screen display 400 corresponding to a process script. The first screen display 400 might be transmitted by interactive web shop 120.3 to a client terminal 110 of a first user with a first scope of rights. The screen display 400 presents a plurality of selectable existing transactions 401 and a plurality of selectable new transactions 402.

FIG. 4B shows a second screen display 450 corresponding to the same process script as in FIG. 4A, but where the second screen display 450 is transmitted by interactive web shop 120.3 to a client terminal 110 of a second user with a second scope of rights that is smaller than the first scope of rights. The screen display 450 presents a plurality of selectable existing transactions 451 and a plurality of selectable new transactions 452. As can be seen, the screen display 450 presents a reduced set of navigation keys as compared to screen display 400; i.e., the set of transactions 451, 452 is more limited than the set of transactions 401, 402. For example, in field 451 of display 450, existing transactions "Invoices", "Credit Memos", "Debit Memos" and "Auctions" are not displayed and thus not selectable, whereas in field 401 of display 400, these transactions are displayed and are consequently selectable. Similarly, in field 402 of display 400, new transactions "Get New Quotation", "Get new Get New Quotation on the basis of an order template" and "Order existing Quotation" are displayed and therefore selectable. By contrast, in field 452 of display 450, the latter new transactions are not displayed and consequently are not selectable.

Figure 5:
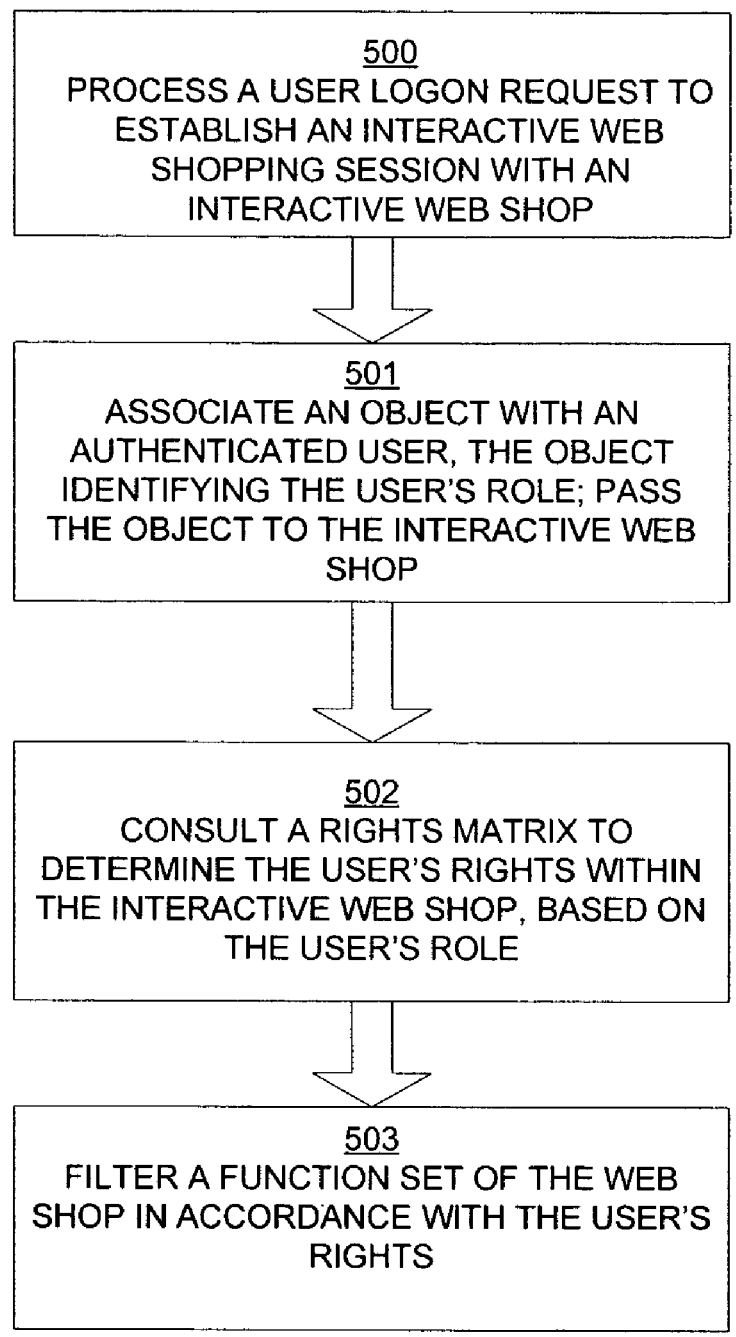
FIG. 5 shows a method flow according to embodiments of the present invention.

In view of the foregoing, FIG. 5 shows a method flow according to embodiments of the present invention. As shown in block 500, the method may include processing a user logon request to establish an interactive web shopping session with an interactive web shop. Processing the user logon request may comprise receiving a user identification and password from the user, and authenticating the user by matching the user identifier and password received with the request with a user identifier and password in a user profiles database. As shown in block 501, the method may further include, if a user is authenticated, associating, with the authenticated user, a user object identifying the user's role, and passing the user object to an interactive web shop.

The interactive web shop may consult a rights matrix to determine the user's rights within the web shop, based on the user's role, as shown in block 502.

As shown in block 503, the method may further include filtering a function set of the web shop in accordance with the user's rights, to present to the user only those functions that he or she has permission to perform.

Embodiments of the present invention may further comprise functionality for defining new roles and assigning the new roles respective rights, or for modifying the rights of existing roles. For example, the embodiments may include an administrative function that lets a business organization create user identifiers and passwords for its employees, and assign respective roles and corresponding rights to the user identifiers. The latter may include, for example, creating and storing a role-to-rights mapping as shown in FIG. 2.

A computer program or collection of programs comprising computer-executable instructions according to embodiments of the present invention may be stored on a machine-readable medium such as disk (e.g., "hard" or "fixed" disk). Other machine-readable media that the instructions may be stored on include "floppy" disk, CD-ROM, and magnetic tape. The computer-executable instructions may be retrieved from the machine-readable media using a suitable reading device into a memory and executed by a processor. The computer-executable instructions may be distributed across a plurality of media, such as on physically separate storage devices respectively associated with physically separate computer systems that may communicate via a network. The functionality disclosed hereinabove may find specific implementations in a variety of forms, which are considered to be within the abilities of those of ordinary skill in the pertinent art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system comprising:
a computer server provided in communication with a terminal of a system user and executing program instructions that cause the server to:
authenticate a user to an interactive web shop;
store authentication data for users and communicate the authentication data to the user logon processing instructions;
process an interactive web shopping session with an authenticated user;
determine a scope of user access to functions of the web shop during the web shopping session; and
during the web shopping session, control a progression of stages in the web shopping session according to a process script that defines a complete set of operational stages available in the web shopping session and a corresponding function set for each stage, the process script controlling, based on user authorization instructions, which successive operational stages are available to the user and which functions from the corresponding function set are available at a particular stage in the progression, and to display only those navigation keys that are associated with permitted successive operational stages,
wherein the process script includes a root stage with a corresponding function set and a plurality of subsequent stages, each subsequent stage having a corresponding function set.

2. The system of claim 1, wherein the scope of user access relates to the user's role within an organization.

3. The system of claim 2, program instructions that cause the server to correlate a role with a scope of user access to functions of the web shop.

4. A method, in an interactive web shopping session with a web shop, comprising:
interacting with a user according to a predefined process script that identifies stages of interaction in the web shopping session, the process script defining a complete set of stages available in the web shopping session and a corresponding function set for each stage;
consulting a rights matrix defining a plurality of user roles and permissions therefor;
determining which successive stages are available to the user and a scope of the user's access to available functions of the web shop based on information in the rights matrix; and
filtering, by the predefined process script and as the user interacts with the web shopping session, a function set of the web shop based on the available successive stages and scope of the user's access, and presenting a new stage of interaction with the filtered function set and only those navigation keys that are associate with permitted successive stages to the user,
wherein the process script includes a root stage with a corresponding function set and a plurality of subsequent stages, each subsequent stage having a corresponding function set.

5. The method of claim 4, wherein the scope of the user's access relates to the user's role within an organization.

6. The method of claim 4, wherein the filtering comprises presenting to the user only those functions the user has permission to perform.

7. A method, in an interactive web shopping session, comprising:
for a user, consulting a rights matrix defining user roles and permissions therefor;
presenting operational stages for the web shopping session to the user according to a predetermined process script that defines a complete set of operational stages available in the web shopping session and a corresponding function set for each operational stage;
during the web shopping session, as new operational stages are reached:
identifying, by the predefined process script, based on information in the rights matrix, with reference to the permissions associated with the user's role, which successive operational stages are available to the user and which functions are available to the user at each stage, and presenting content of the respective new operational stages to the user and displaying therein only those navigation keys that are associated with the permitted successive operational stages,
wherein the process script includes a root stage with a corresponding function set and a plurality of subsequent stages, each subsequent stage having a corresponding function set.

8. The method of claim 7, wherein a user role is assigned an authorization level within an organization.

9. A machine-readable medium comprising computer-executable instructions to perform a method for interactive web shopping, the method comprising:
for a user, executing a process script identifying successive stages in the web shopping session, process script defining an inter-related set of operational stages of the web shopping session that are available to a user with full rights and a corresponding function set for each successive stage;
consulting a rights matrix defining a plurality of user roles and permissions therefor; and
determining, by the process script, which successive stages are available to the user and a scope of the user's access to available functions of the web shop based on information in the rights matrix, and at a particular stage of the identified stages, the process script filtering the corresponding function set of the web shop based on the scope of the user's access and providing the filtered function set and only those navigation keys that are associate with permitted successive stages to the user,
wherein the process script includes a root stage with a corresponding function set and a plurality of subsequent stages, each subsequent stage having a corresponding function set.

10. The machine-readable medium of claim 9, wherein the scope of the user's access relates to the user's role within an organization.

11. A method comprising:
in response to a user request to establish an interactive web shop session, executing a process script to control a progression of stages in a web shopping session, the process script defining a complete set of operational stages available in the web shopping session and a set of functions available at each corresponding stage;
consulting, at stages of the progression, by the process script, a rights matrix, including an organizational mapping comprising definitions of permitted operational stages and corresponding functions at each stage per a user's role in an organization, identifying permitted successive stages and available functions corresponding to each stage to a reduced subset of functions permitted in each stage, wherein the process script includes a root stage with a corresponding function set and a plurality of subsequent stages, each subsequent stage having a corresponding function set; and displaying to the user only the permitted functions and those navigation keys that are associated with permitted successive stages.

12. The method of claim 11, wherein the permitted set of functions is manifested by only displaying to the user navigation keys corresponding to the permitted function set.

13. A machine-readable medium storing computer-executable instructions to implement a process script according to claim 11.

14. The method of claim 4, further comprising running multiple instances of the web shopping session for multiple users in which each instance refers to a common process script and tailors interaction of the web shopping instance according to access rights of a respective user.

* * * * *